May 10, 1932.  E. H. SMYTHE  1,857,794

WAVE ENERGY TRANSLATING DIAPHRAGM AND METHOD OF MOUNTING IT

Filed Aug. 3, 1929  2 Sheets-Sheet 1

INVENTOR
E. H. SMYTHE
BY
Walter C. Kiesel
ATTORNEY

May 10, 1932.    E. H. SMYTHE    1,857,794
WAVE ENERGY TRANSLATING DIAPHRAGM AND METHOD OF MOUNTING IT
Filed Aug. 3, 1929    2 Sheets-Sheet 2

INVENTOR
E. H. SMYTHE
BY
Walter C. Kiesel
ATTORNEY

Patented May 10, 1932

1,857,794

UNITED STATES PATENT OFFICE

EDWIN H. SMYTHE, OF EVANSTON, ILLINOIS, ASSIGNOR TO BELL TELEPHONE LABORATORIES, INCORPORATED, OF NEW YORK, N. Y., A CORPORATION OF NEW YORK

WAVE ENERGY TRANSLATING DIAPHRAGM AND METHOD OF MOUNTING IT

Application filed August 3, 1929. Serial No. 383,397.

This invention relates to wave energy translating diaphragms and methods for mounting and tensioning them. More specifically, it refers to a diaphragm mounting of the type particularly adapted for use in telephone transmitters, receivers, phonographs and like acoustical devices.

The object of this invention is to uniformly tension a diaphragm and to maintain it in its tensioned condition in a simple manner.

A further object of this invention is to reduce the cost of manufacture, simplify the structure, and increase the efficiency of diaphragms of the stretched or tensioned type and their mountings.

One feature of this invention resides in uniformly tensioning a wave energy translating diaphragm by clamping or otherwise securely fastening the diaphragm on its outer peripheral portion to a mounting comprising a ring, a pair of annular members, or a bifurcated annular member and crimping or corrugating said mounting member and that portion of the diaphragm secured thereto.

Another feature of this invention, resides in means provided for corrugating or crimping the mounting member to which the diaphragm is secured. Forming members, having curved surfaces, to produce the desired shape of corrugation or crimp in the mounting, are provided between which, in an undeformed state, the mounting is placed.

Other features and advantages will be apparent from the disclosure which follows and the appended claims.

A more complete understanding of my invention may be had by reference to the accompanying drawings wherein.

Figure 1:
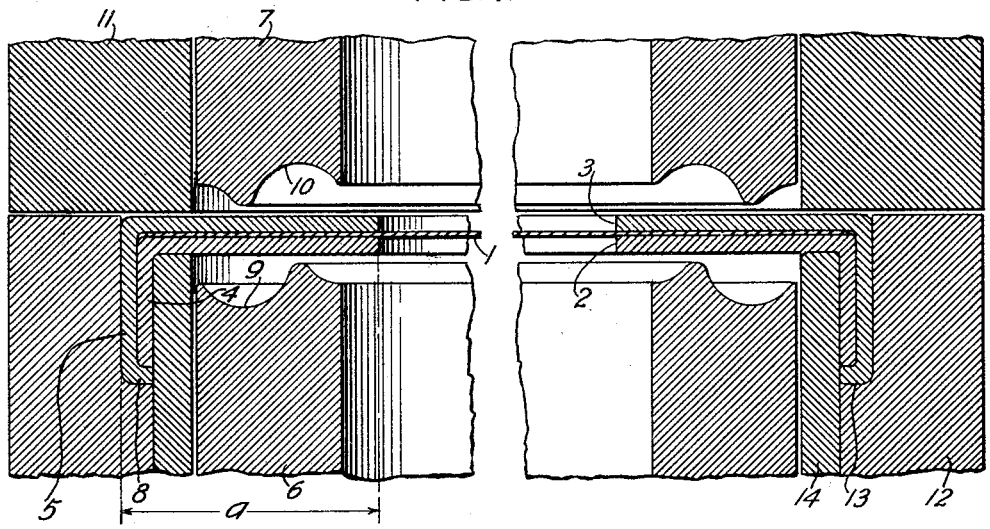
Fig. 1 shows in section a preferable means for producing a uniform tension in a diaphragm, by deforming the mounting to which it is secured, and also illustrates a preferred diaphragm mounting.
Figure 2:
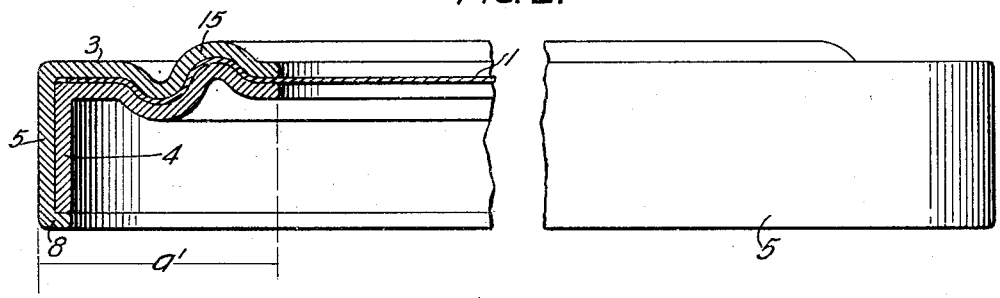
Fig. 2 illustrates the diaphragm mounting subsequent to the deformation to produce a desired tension.

Referring now to Figs. 1 and 2 there is shown a large direct acting diaphragm 1 of aluminum or any light weight, high strength material, although this invention is not limited to the employment of these materials, secured between annular peripheral members 2 and 3 having annular flanged portions 4 and 5 respectively. The flange 5 of member 3 has a turned portion 8 which firmly clasps member 2 holding it rigidly against the diaphragm 1. The diaphragm is secured permanently to the annular member by cementing, soldering, welding, brazing or sweating it to the inner surface of one or both of them. The diaphragm and mounting is assembled, external to the shaping device and of course, is then placed within such a device provided for corrugating or crimping those portions of the mounting ring to which the diaphragm is secured. This shaping means will now be described.

It comprises a diaphragm mounting support 12 having an annular shelf portion 13 adapted to support the mounting; an annular member 14 capable of vertical movement and designed to bear against the flange 4 of the peripheral member 2; an annular member 11 capable of vertical movement and designed to bear against the diaphragm mounting support 12 and to press downwardly on the outer annular portion of the peripheral member 3; and shaping members 6 and 7 having suitably curved jaws 9 and 10 in juxtaposed relationship.

Fig. 1 shows the elements of the shaping means in position to produce the desired deformation in the mounting member and the consequent tensioning of the diaphragm. The approach of the shaping members 6 and 7 toward one another produces in the diaphragm mounting and in the diaphragm the annular corrugation 15 (Fig. 2) causing a uniform radial decrease in dimension $a$ to $a'$. Since the mounting is held rigidly by members 14 and 11 the change in dimension is made possible only by stretching in the diaphragm and, since this stretching takes place uniformly about the circumference of the diaphragm, a uniform radial tension is introduced therein. It is understood, of course, that it is possible to introduce into the diaphragm any degree of uniformly or non-uniformly distributed tension. It is desirable to keep the tension in the diaphragm at least slightly below the elastic limit of the diaphragm material.

To release the diaphragm mounting, now in the form illustrated by Fig. 2, members 14 and 11 are moved downwardly below the shelf 13 and upwardly, respectively, in lagging time relationship to the shaping members 6 and 7. The uniformly tensioned diaphragm and mounting is now ready for use in an acoustic device.

It is obvious that the method outlined is conducive to economical quantity production and to uniformity in quality of the mounted diaphragms, regardless of size, and permits of applying the principle of interchangeable parts to at least one element of acoustic devices.

It is conceivable that it might not always be feasible or desirable to secure the diaphragm to its mounting by solder, cement or the like. When such is the case, the expedients shown in Figs. 3 and 4 may be employed.

Figure 3:
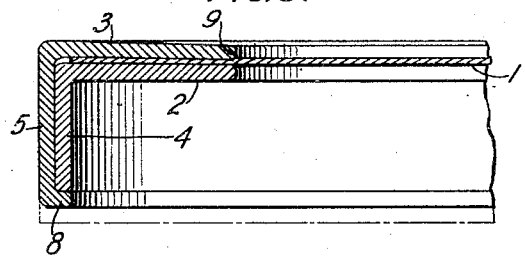
Fig. 3 illustrates a method for securing a diaphragm effectively against slipping, to its mounting.
Figure 4:
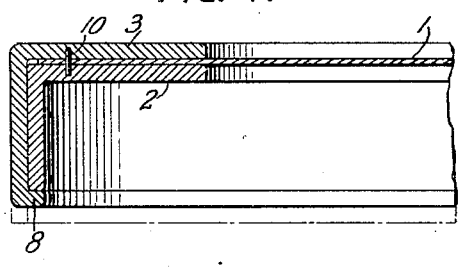
Fig. 4 illustrates another method of holding diaphragms between annular peripheral members.

In Fig. 3, the annular member 3 is machined so as to be bent slightly from the horizontal in order that, when the diaphragm 1 and the mounting members are assembled and the flange 5 of the outer mounting member turned up to rigidly clasp the inner mounting member against the diaphragm 1, it will press firmly into the diaphragm. The diaphragm is securely clamped between the mounting members and is prevented by frictional forces against movement relative to said members. Tearing of the diaphragm, which might occur when it is being tensioned, may be prevented by providing peripheral member 3 with a smooth rounded edge 9. Fig. 4 illustrates the other expedient. A pin 10, which passes through an opening in the diaphragm near its circumferential edge, is fitted, as the mounting is assembled, into suitable recesses in the inner surfaces of the members 2 and 3. As will be readily understood, a number of these pins may be used about the diaphragm's periphery and be so placed that they are outside the region undergoing deformation. The dotted lines in these figures indicate the condition of the flanged portion 5 of peripheral member 3 before it is turned up to rigidly clasp the inner peripheral member of the mounting.

Figure 5:
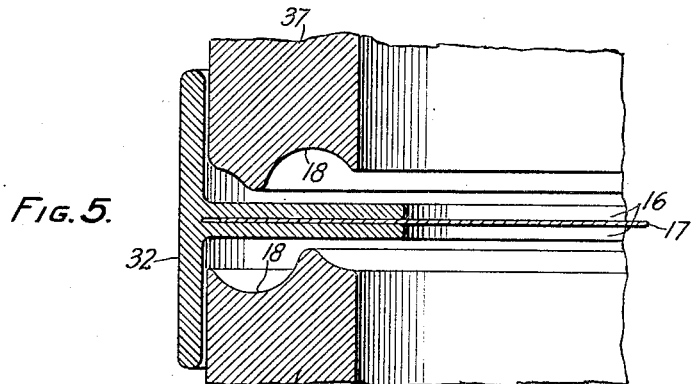
Fig. 5 illustrates fragmentarily a modification of the diaphragm mounting shown in Fig. 1.

The fragmentary sectional view of an embodiment of my invention shown in Fig. 5 discloses a modification of the diaphragm mounting and a simplified shaping means. A T section bifurcated annular mounting member 32 is employed to the inner side of whose bifurcations 16 is secured the diaphragm 17. The mounting is placed between annular shaping members 37 having suitably shaped jaws 18. The shaping to which this mounting may be subjected is similar to that shown in Fig. 2, the cross bar of the T preventing more than a small displacement of the mounting when the latter is being corrugated under the deforming action of the shaping members.

Figure 6:
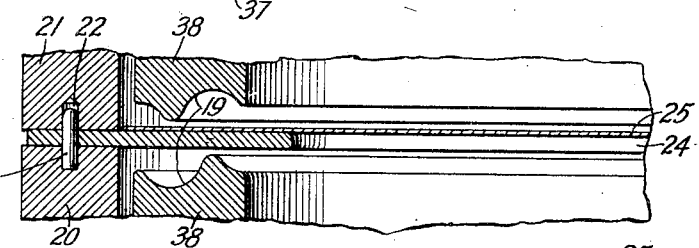
Fig. 6 illustrates a modification of the shaping means shown in Fig. 1 and also of the diaphragm mounting.
Figure 6A:
Figs 6A and 6B illustrate possible shapings of the diaphragm mounting shown in Fig. 6.
Figure 6B:
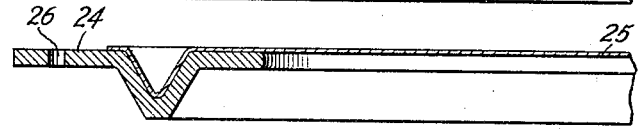

Another modification of my invention is illustrated by Figs. 6, 6A and 6B wherein an annular diaphragm mounting 24, to which is secured a diaphragm 25, is supported by a stationary member 20 from whose recessed surface a pin 23 projects through an opening 26 provided in the mounting member 24. A number of such openings may be provided at spaced intervals in the mounting member about its periphery. The upper and movable annular member 21 has a recess 22 capable of engaging with the pin 23. The shaping members 38 capable of vertical movement, are annular in shape and have suitably shaped jaws 19. When the latter approach one another, the movable member 21 precedes them by a time interval sufficient to have the mounting rigidly held before the shaping jaws start to deform the mounting member 24 and the diaphragm 25 secured thereto. When deformed the mounting will have the form indicated by Fig. 6A wherein the diaphragm 25 is in a tensioned condition produced by the enlargement of the inner periphery of the mounting member. Fig. 6B illustrates another shaping of the mounting member which might be employed if desired.

Figure 7:
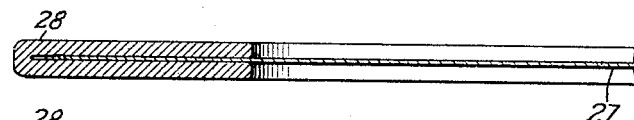
Fig. 7 illustrates a diaphragm mounting consisting of a bifurcated annular member.
Figure 7A:
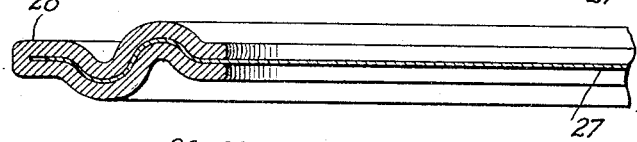
Fig. 7A illustrates a possible shaping of this mounting to produce a uniform tension in the diaphragm.

Figs. 7 and 7A illustrate a modification of the embodiment of the mounting means shown in Fig. 5. A bifurcated annular member 28 is employed between whose bifurcations a diaphragm 27 is cemented, soldered or otherwise secured. Fig. 7A illustrates the mounting in a deformed condition, having corrugations therein, and diaphragm 27 in a tensioned condition.

Figure 8:
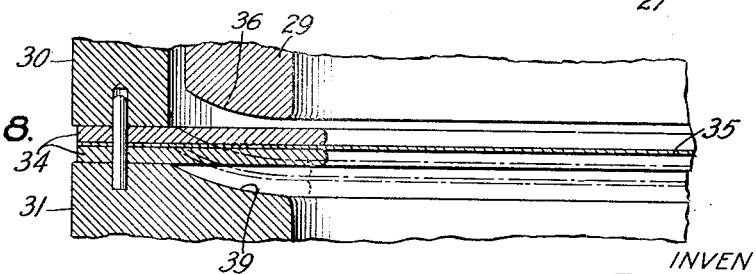
Fig. 8 illustrates still other means for stretching a diaphragm by shaping the mounting to which it is secured.

Fig. 8 shows still another variation in the means for carrying out the method of uniformly tensioning a large direct acting diaphragm which comprises this invention. One forming tool 29 only is employed, the lower member 31 being provided with a curved surface 39. The diaphragm mounting consists of two annular members 34 between which the diaphragm 35 is positioned and secured. The arrangement described with reference to Fig. 6, for holding the diaphragm mounting rigidly, is provided. The mounting, when subjected to the deforming action of the surface 36 of the shaping member 29, assumes the shape indicated by the dotted lines whereby its inner periphery is enlarged and the diaphragm thereby stretched or tensioned uniformly in a radial direction.

In each of the embodiments described above the mounting members should be of a material having temperature coefficients of contraction and expansion of the same, or approximately the same, order as that of the diaphragm material to prevent disturbance of the diaphragm's uniformly tensioned condition because of variations in atmospheric conditions.

In employing the method outlined above for producing a uniform tension in a diaphragm it is understood that the curved surfaces of the deforming members employed should be of uniform contour in order that the deformation of the mounting member shall be of the same order throughout the periphery; in other words, the increase in radius of the diaphragm shall at all points of its circumference be the same.

What is claimed is:

1. The method of mounting and tensioning a wave energy translating diaphragm of a material that can be stretched which consists in securing said diaphragm to a mounting member of a material that will retain its shape after being deformed and corrugating said mounting member to increase its inner peripheral dimension thereby tensioning said diaphragm.

2. The method of mounting and uniformly tensioning a sound translating diaphragm of an extensible material which consists in securing the diaphragm at its peripheral portion to a mounting member of a material which may be permanently deformed and thereafter corrugating said member, different portions of said member occupying different planes and its inner peripheral dimension being increased whereby said diaphragm is tensioned.

3. The method of uniformly tensioning a vibratory diaphragm of a material that can be stretched which consists in securing the diaphragm to an annular mounting member of a permanently deformable material, and corrugating said mounting member to deform it whereby the area of said diaphragm is increased.

4. The method of uniformly tensioning a large direct acting diaphragm of an extensible material which comprises permanently securing said diaphragm to an annular mounting member of a material which may be permanently deformed, and deforming said annular member whereby the inner radial dimension of said mounting member is increased thereby tensioning the diaphragm.

5. The method of mounting and tensioning to a high degree a wave energy translating diaphragm of a material that can be stretched which comprises securing said diaphragm to a mounting member of a material that will retain its shape after deformation, and thereupon deforming said mounting member and that portion of the diaphragm secured thereto whereby the inner peripheral dimension of said mounting member is increased thereby tensioning said diaphragm.

6. The method of mounting and tensioning a wave energy translating diaphragm of extensible material which comprises securing said diaphragm between a pair of annular members of a permanently deformable material and corrugating said members to deform them whereby the inner peripheries of the annular members are enlarged thereby tensioning the diaphragm.

7. A wave energy translating device comprising a pair of annular mounting members, one of said members being positioned within the other, and a diaphragm, said diaphragm being secured to the inner surfaces of said mounting members, said members having flange portions, that of the outer mounting member being turned inward to firmly clasp the flange portion of the inner annular member.

8. The method of mounting and tensioning a wave energy translating diaphragm of a material that can be stretched which consists in securing said diaphragm on a peripheral portion to its mounting in the same plane thereof, said mounting being of a material which will retain its altered shape after being deformed, and deforming said mounting, the diaphragm and the mounting assuming positions in different planes whereby the inner peripheral dimensions of the mounting is increased thereby tensioning the diaphragm.

9. The method of mounting and tensioning a wave energy translating diaphragm which consists in securing said diaphragm on its peripheral portion to its mounting, said mounting and diaphragm being in the same plane, and corrugating said mounting and that portion of the diaphragm secured thereto, whereby portions of said mounting occupy different planes from that in which the diaphragm is positioned, whereby the inner peripheral dimension of the mounting is increased, thereby tensioning said diaphragm.

In witness whereof, I hereunto subscribe my name this 26th day of July, 1929.

EDWIN H. SMYTHE.